Patented Dec. 6, 1927.

1,651,366

UNITED STATES PATENT OFFICE.

PAUL BERTHON, OF LYON, FRANCE, ASSIGNOR TO SOCIÉTÉ DE STEARINERIE ET SAVONNERIE DE LYON, OF LYON, FRANCE.

PROCESS OF PREPARATION FROM STARCH, OF ESTERS OF THE HIGHER FATTY ACIDS, SOLUBLE IN HYDROCARBONS OF THE AROMATIC SERIES.

No Drawing. Application filed March 6, 1923, Serial No. 623,283, and in France December 21, 1922.

The acetylated combinations of hydrates of carbon and of soluble starch are known, as well as the benzoylated combinations of soluble starch. The preparation of esters of the higher fatty acids starting with acetates of starch and of palminate of mannite is known together with that of the esters of cellulose of the higher fatty acids.

The present process relates to the preparation of soluble esters of the higher fatty acids from ordinary starch. The process allows the preparation of thin, transparent, uninflammable films which, owing to their solubility, are applicable to the greatest variety of technical purposes. The solutions of the substances obtained by this process are completely clear and, by means of evaporation, transparent substances are obtained even without subsequent addition of an adjuvant. The process enables the starch to be completely used without previous preparation by transformation into soluble starch.

The carbohydrate esters obtained by my process are soluble in the aromatic series of hydrocarbons such as benzene or toluene whereas the known cellulose esters are entirely insoluble in these substances.

The esterification of the starch is effected by the direct action on the latter of the acid chlorides of the aforesaid acids. The reaction, which can proceed by mixing the various diluted or non-diluted components in chloroform, tetrachloride of carbon, halogenous derivatives of acetylene, of benzene, etc. is facilitated by the addition of such substances as, chloride of zinc, pyridine, quinoline or any like bases. It is primed at the usual temperature with a notable discharge of heat; it is completed by gradually raising the temperature.

The carbohydrate esters appear in the form of scentless amorphous beads, uninflammable, soluble in a very large number of solvents, and, in particular, chloroform, halogenous derivatives of acetylene, tetrachloride of carbon and benzenic hydrocarbons such as benzene, toluene and the like.

The solutions of carbohydrate esters are perfectly clear and furnish by means of evaporation alone colorless, translucent and uninflammable pellicles.

These properties enable the solutions to be employed, either pure or mixed with cellulose esters in the manufacture of various plastic materials, coatings, sizes, varnishes, fabrics, stuffs, papers, leathers, photographic and cinematographic films.

The following example, given merely as an indication shows the process to be followed for the manufacture of palmitate of starch:

100 grams of dry starch are moistened with a mixture of 400 grams of benzene and 180 grams of pyridine; a mixture of 600 grams of palmityl chloride and 400 grams of benzene is added by portions; the heating follows for half an hour in the water bath at 60° with continual stirring. When the reaction is terminated the ester formed is precipitated by the addition of alcohol; then follows washing, drying, etc.

The palmitate of starch obtained, dissolved in benzene gives, by evaporation of the solvent, a colorless, translucent and uninflammable film.

The suitable apparatus are those now employed in the chemical industry.

What I claim as my invention and desire to secure by Letters Patent of the United States is:—

A process for the preparation of starch esters consisting in moistening starch with a mixture of benzene and pyridine, adding a mixture of palmityl chloride and benzene, heating the whole with continual stirring, precipitating the starch esters by the addition of alcohol and washing and drying the same.

In witness whereof I have signed this specification.

PAUL BERTHON.